UNITED STATES PATENT OFFICE.

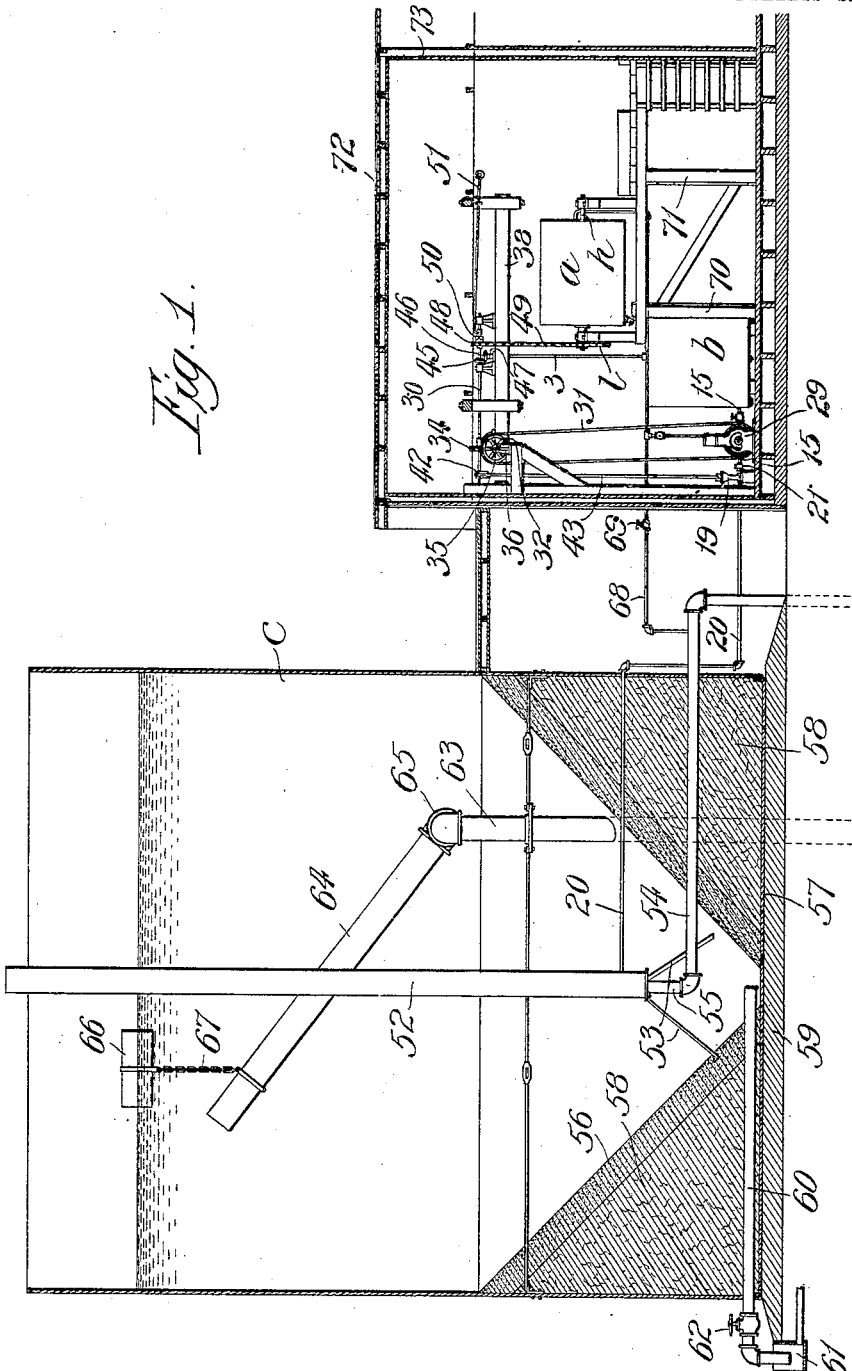

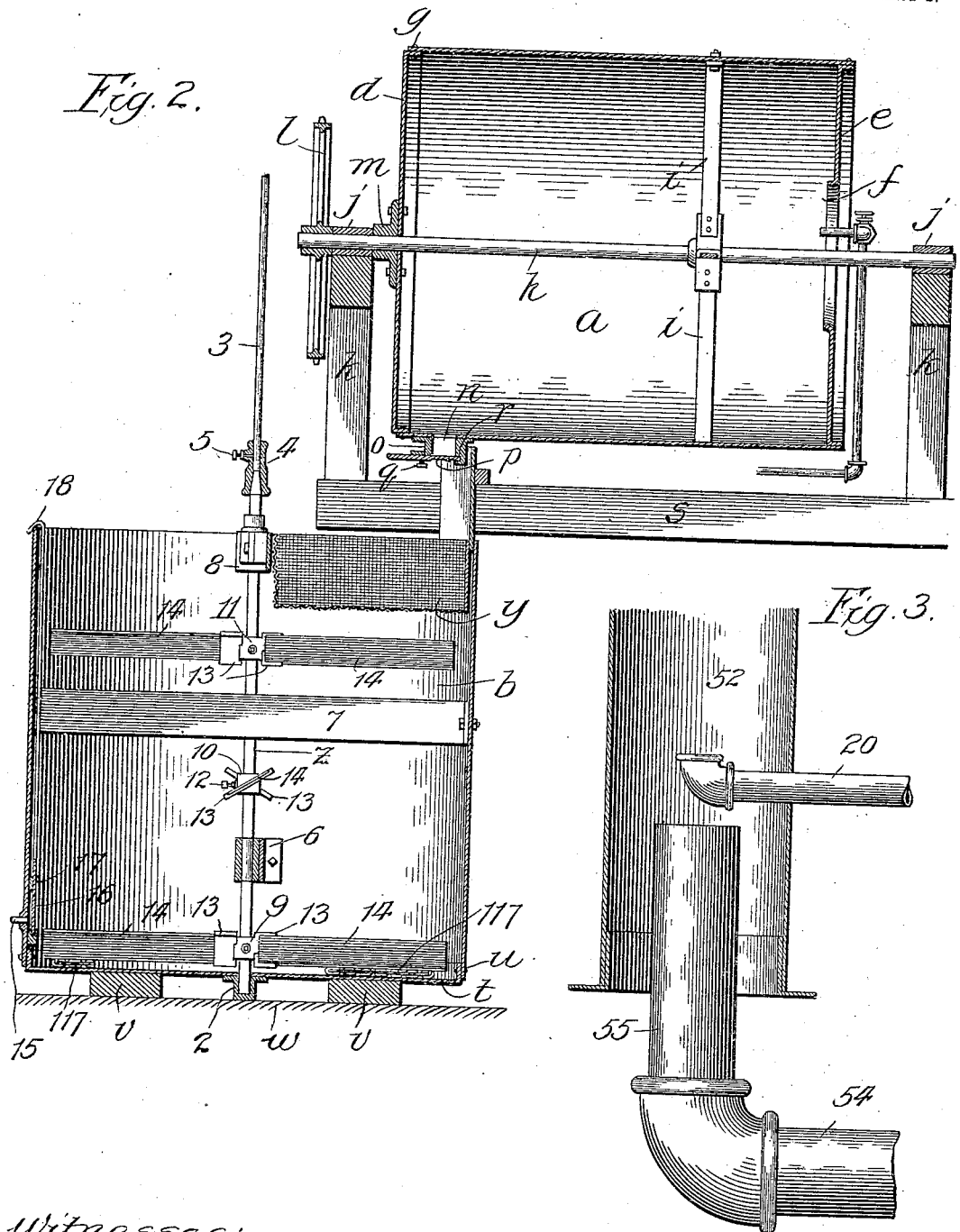

WILLIAM A. POWERS, OF TOPEKA, KANSAS.

PROCESS FOR TREATING AND STORING WATER.

946,463.  Specification of Letters Patent.  Patented Jan. 11, 1910.

Application filed October 10, 1904. Serial No. 227,845.

*To all whom it may concern:*

Be it known that I, WILLIAM A. POWERS, a citizen of the United States, residing at Topeka, in the county of Shawnee and State of Kansas, am the inventor of certain new and useful Improvements in Processes for Treating and Storing Water, of which the following is a specification.

My invention relates to that class of processes for treating and storing water in which lime is slaked and intermixed with soda-ash and a sufficient quantity or proportion of water to form a liquid solution or mixture, and this is introduced into the water to be treated.

The principal object of my invention is to provide a process for treating and storing water, whereby lime may be slaked with such uniformity as to retain substantially its full strength, and whereby water in the proper amount may be supplied to the lime at the proper instant to completely slack the particles thereof and prevent burning.

A further object is to provide a process whereby soda-ash may be held in suspension and thoroughly and uniformly dissolved and mixed with the lime and a suitable proportion of water to form a liquid chemical solution or mixture, and such solution or mixture then introduced into the water to be treated.

A further object of the invention is to provide an improved process in the practice of which the chemical solution for treating the water may be introduced therein and the entrained air permitted to escape before such water is permitted to mingle with water which has been similarly treated and allowed to settle, and in such a manner that the entrained air is prevented from coming in contact with the precipitates contained in such water as has already been similarly treated.

Other and further objects of the invention will appear from an examination of the drawings and the following description and claims.

In practicing my improved process I employ an apparatus or mechanism, such as will be found illustrated in the accompanying drawings, in which—

Figure 1 is an elevation, partly in section, showing a suitable apparatus for containing the water to be treated and mechanisms employed in mixing and preparing the chemical solution, including the slaking of the lime and dissolving of the soda-ash to be used; Fig. 2 a detail sectional elevation showing the drum in which the lime is slaked and the soda-ash dissolved and the chemical tank for containing the chemical solution prepared in such revolving drum; and Fig. 3 an enlarged detail, partly in section, showing the arrangement of the water and chemical mixture supply pipes and the open stand-pipe.

In constructing an apparatus for use in practicing my improved process for treating and storing water, including the preparation of the chemical mixture or solution and the slaking of the lime and dissolving of the soda-ash used in forming such mixture, I provide a revolving drum *a* in which the lime is slaked and the soda-ash dissolved, a chemical tank *b* for containing the chemical reagent formed in the revolving drum by the mixture of the slaked lime and soda-ash with the desired amount of water, and a treating and storage tank *c* for containing the water to be treated during and after treatment and for permitting the introduction and mixture of the water and chemicals and the separate withdrawal of the treated water and the sediment and precipitates—as hereinafter more particularly described.

The drum *a* consists of a metallic shell portion, preferably cylindrical, having a metallic closed end portion *d* and an opposite end portion *e*, having a suitable opening *f*,—such end portions being united to the cylindrical shell portion by means of rivets *g* or in any ordinary and well-known manner, so as to form a water-tight connection. This drum is mounted upon and in fixed relation to a rotatable shaft *h*,—suitable braces *i* being provided at or near the open end of the drum for supporting the drum upon the shaft. This shaft is rotatably mounted in bearing portions *j* of suitable standards *k*, and is provided at one end, preferably near the closed end of the drum, with a suitable sprocket wheel *l* by means of which the shaft and thereby the drum is connected with a suitable source of power. A collar *m* is secured to the closed end of the drum and to the shaft between the drum and standard, so that the longitudinal movement of the shaft in the standard is prevented. A suitable support for the closed end of the drum upon the shaft and a tight connection with the shaft is thereby provided. A suitable outlet opening *n* is provided, preferably near the closed end of the drum,—a hollow stud or stub-pipe *o* being provided with an outlet passage communicating with such outlet opening in the drum, and having a suitable gate *p* pivotally mounted upon a pivot *q* and extending into a socket portion *r* for opening and closing the outlet passage when desired. Suitable planks *s* are connected with the standards in which the drum is mounted and form, in connection with such standards, a portion of the supporting framework which supports the apparatus. The supporting framework may be formed in any ordinary and well-known manner, but preferably substantially as herein described.

The chemical tank *b* is formed of an outer substantially cylindrical metallic shell portion having a preferably metallic bottom portion *t* united thereto by means of rivets *u* or in any ordinary and well-known manner to form a water-tight tank, the bottom of the tank resting upon supports *v* and a suitable floor *w*. This tank is for receiving and containing the chemical mixture or solution prepared in the revolving drum—already described—and is, therefore, mounted preferably beneath at least that portion of the revolving drum which contains the outlet opening. A screen *y* formed of reticulated material,—such as wire-cloth or wire-screening,—having a mesh of about ten strands to the inch, is mounted at or near the top of the chemical tank and beneath the outlet opening of the revolving drum, so that the movement of the revolving drum may be arrested at any time with the outlet opening over the screen, so as to discharge the contents of the drum through the screen and into the chemical tank. The mesh of the screen is sufficiently fine to prevent the discharge therethrough of any sediment which may be contained in the mixture,—such as unslaked particles of lime or undissolved portions of the material contained in the lime. The sediment may be afterward removed from the screen or filter in any desired manner.

It is desirable to provide suitable mechanism to be used in agitating the contents of this chemical tank so as to maintain the precipitates in suspension. In order to accomplish this, I provide a preferably vertical shaft *z* having its lower end rotatably mounted in a suitable bearing 2 and its upper end connected by means of a connecting shaft 3 and suitable shafting and gears with a suitable source of power. The manner in which I connect this shaft with the engine will be found hereinafter more particularly described. While these shafts may, of course, be integral I prefer, for the sake of convenience, to make them of separate pieces and connect them by means of a suitable joint or socket 4 which, as shown in Fig. 2, may be shrunk upon the upper end of the shaft *z* and connected to the connecting shaft or rod 3 by means of a suitable set screw 5, thus enabling the assembling and dismantling of the parts to be readily accomplished. The shaft *z*, in addition to the lower bearing 2—already described,—is also provided with suitable supports 6 and 8 each of which has suitable bearing portions through which the shaft extends. Three brackets 9, 10 and 11 are each secured to the shaft at suitable intervals by means of suitable set screws 12 or in any similar ordinary and well-known manner, each of such brackets being provided with a pair of arms or socket portions 13 in which are mounted laterally extending paddles or arms 14. The individual paddles of each pair are inclined from edge to edge in opposite directions, so that the rotation of the shaft and thereby the paddles will produce the desired agitation of the material contained in the tank. One or more back pressure brakes 7 are provided to prevent the liquid from rotating with the paddles, and chains 117 revolve with the paddles so as to stir up sediment from the bottom and prevent clogging. An outlet pipe 15 is arranged near the bottom of the chemical tank to form the outlet, and a suitable gate 16 is slidably mounted in ways 17 and provided with a handle 18 by means of which such gate may be operated to open or close the outlet passage as desired.

A pump 19 is provided having its receiving side connected with the pipe 15 and thereby with the interior of the chemical tank, the discharge side of the pump being connected by means of a chemical feed pipe 20 and stand-pipe 52 with the interior of the treating and storage tank. This pump is provided with an inlet valve 21, and a similar outlet valve—not shown—in the form of ball valves, which are connected to the pipes 15 and 20, respectively, and to the cylinder 23 of the pump.

In order to provide suitable means for driving the pump, the revolving drum and the mechanism for agitating the contents of the chemical tank, I provide an engine 29, which may be of any ordinary and well-known type, and therefore need not be described here in detail. In lieu of an engine, a suitable electric motor, water motor, or other suitable known source of power may be employed.

The driving wheel of the engine is connected to the shaft 30 by means of a belt 31, a pulley 32 having a worm—not shown—meshing with a worm wheel 34, such worm wheel being mounted in fixed relation to the shaft 30, and the pulley being mounted in fixed relation to the worm shaft 35. The worm shaft 35 is mounted in brackets 36, such brackets being supported upon suitable supports which may be of any ordinary and well-known type. The shaft 30 is rotatably mounted in brackets which are supported upon a beam 38. The shaft 30 is connected with the pump by means of a suitable eccentric 42, of any ordinary and well-known type, and connecting rod 43, such connecting rod being connected with the piston of the pump in any suitable well-known manner. The shaft 30 is operatively connected with the shaft $z$ and the agitating mechanism in the chemical tank by means of a bevel gear 45 on the shaft 30 and a meshing bevel gear 46 upon the connecting shaft 3—already described. The shaft 3 is rotatably supported in a bearing 47 and connected with the shaft $z$ in the chemical tank in the manner already described. The shaft 30 is operatively connected with the revolving drum $a$—already described—by means of a sprocket wheel 48, mounted upon such shaft, and a sprocket chain 49 which connects such sprocket wheel with the sprocket wheel $l$ upon the shaft $h$ of the rotatable drum. The sprocket wheel 48 is provided with a clutch 50, which is slidably mounted upon the shaft 30, so as to connect and disconnect such shaft and sprocket wheel as desired, the clutch being operated by means of a suitable rod 51. By this arrangement the revolving drum may be thrown out of operative connection with the source of power and its rotation stopped or continued whenever desired.

It is very desirable to mix the chemicals with the water to be treated before it mingles with the water already contained in the treating and storage tank, and to permit the entrained air in the water to be treated to escape without mingling with the water already similarly treated and contained in such tank, so that such air when escaping will not come in contact with the precipitates contained in the tank and interfere with the settling of the precipitates. It is also desirable that the water introduced into the treating and storage tank be so directed downward at the point of mingling with the water already contained in the tank that it will direct the precipitates mixed with the inflowing water toward the bottom of the tank, so as to facilitate the settling of such precipitates. It is also desirable that the inflowing water be so directed at its point of mingling with the water already contained in the tank that it will not cause a current in the tank sufficient to agitate the water already contained therein or prevent the settling of the precipitates, but will permit the treated, softened or purified water to be drawn from near the surface thereof to a constant supply of water to be introduced in such a manner as to raise the clearest or purest portion of the water contained in the tank bodily toward the top. It is also desirable to draw off the precipitates and sediment without disturbing the other contents of the tank and without the necessity of emptying the tank. I, therefore, provide a stand-pipe 52 having a space between its lower end and the bottom of the tank, and having its upper end extending outside of and above the water contained in the tank,—both ends of such pipe being open. The lower end of this stand-pipe is, in practice, about four feet from the bottom of the tank. Suitable stays 53, which may be of any ordinary and well-known type, are provided for holding the stand-pipe in position. A water supply pipe 54 extends into the tank and is provided at its inner end with an upwardly extending discharge portion 5-5 in the form of an elbow which extends into the lower open end of the stand-pipe. The opposite end of this water supply pipe is connected with a suitable source of water supply,—the water, of course, being under sufficient head or pressure to cause it to enter the tank, notwithstanding the pressure of the water already contained therein. The stand-pipe is of a much larger diameter than the upwardly extending or elbow portion of the water supply pipe, so that the water forced into the stand-pipe is caused to flow upward therein until it mingles with the chemicals introduced through the pipe 20 and then with the precipitates to flow out of the lower end of the stand-pipe into the tank mingling with the water already contained in the tank. The course of the precipitates is thus directed toward the bottom of the tank, but the water contained in the tank is not disturbed sufficiently to prevent the precipitates from settling.

The pipe 20 which communicates with the chemical tank has its inner end connected with the stand-pipe and communicating with the interior thereof at a point a short distance above the lower end of the stand-pipe. Its discharge end should preferably extend upward inside the stand-pipe. The water forced into the stand-pipe from the water supply pipe is thus forced upward past the chemical supply pipe and the chemical mixture caused to thoroughly mix with the inflowing water before mingling with the water already in the tank. The stand-pipe being open at the top, it will be readily seen that the entrained air, which escapes from the inflowing water, may pass upward through the stand-pipe and escape without coming in contact with or in any way interfering with the settling of the precipitates in the water already contained in the tank. It will also be noted that the size of the lower opening in the stand-pipe is sufficiently large to provide a sufficient space between the walls of the stand-pipe and the water supply pipe so that the water discharged therefrom into the tank will not cause a current sufficient to agitate the contents of the tank, but will practically raise the water contained in the tank above the outlet of the stand-pipe bodily without disturbing it to any extent.

It is desirable to cause the precipitates to settle in as small a space as possible, so as to be readily withdrawn, and to permit the inflowing of the water with as large a proportion of the contents of the tank as possible, above the inflowing water. The tank is provided with a conical bottom 56 of Portland cement concrete extending downward and inward at an incline from the outer cylindrical walls of the tank to a point near the center of the base thereof. The space between this concrete bottom and the metallic bottom portion 57 of the tank is filled with broken stone and sand which forms a suitable filler 58 for supporting the concrete bottom portion. The metallic bottom portion is, of course, united to the metallic cylindrical shell portion by means of rivets—not shown—or in any ordinary and well-known manner, so as to form a water-tight tank, and the whole is mounted upon a suitable base 59 of broken stone or gravel.

A sediment or sludge discharge pipe 60 extends preferably through the concrete bottom with its inner end opening into the tank at or near the bottom thereof and its outer end communicating with a sludge box 61 or with a sewer or other receptacle for the sediment which is to be drawn off from the bottom of the tank. A suitable cock or valve 62 is provided by means of which this discharge pipe or sediment outlet may be opened or closed when desired. A suitable discharge pipe 63 is arranged in the tank through which the treated water is drawn off for use. It extends out through the bottom of the tank, so as to be connected with a crane in the ordinary manner when employed for railroad use, and is provided on the inside of the tank with a floating pipe portion 64 having a flexible joint 65 by means of which such floating pipe portion is connected with the discharge pipe proper. The upper end of the floating pipe portion is provided with a buoy 66, which is connected with the floating pipe by means of a chain or similar element 67. This buoy is made of wood or other material buoyant in water, and serves to hold the upper end of the floating pipe portion sufficiently near the surface of the water to enable it to draw off only water which has been properly treated. A pipe 68 is connected with the water supply pipe 54 and extends into the open end of the drum—being provided with a cock or valve 69 for opening and closing the passage in such pipe. Water is supplied through this pipe for slaking the lime and dissolving the soda-ash, and through it the water may be introduced regularly during the slaking of the lime.

The planks s, which support the standards k and thereby the revolving drum, are extended sufficiently to form a floor, and this entire floor is supported by suitable frame portions, including uprights 70 and 71, the entire apparatus for mixing and preparing the chemical reagent being provided with a suitable shelter having a roof 72 and inclosing walls 73, which may be of any ordinary and well-known type.

In practicing my improved process, I first prepare a suitable chemical mixture for treating water. This mixture when completed contains slaked lime, or the chemical elements which are produced by slaking lime, and which need not be technically described here in order to enable those skilled in the art to understand and practice the invention, and soda-ash intermixed with such slaked lime in a sufficient quantity of water to make a suitable liquid chemical mixture of the desired strength.

I find in practice that a mixture containing 125 pounds of lime, 50 to 250 pounds of soda-ash, and from 150 to 200 gallons of water—the lime being thoroughly slaked and the soda-ash thoroughly mingled in the water—will produce very satisfactory results and that such a quantity of the mixture is sufficient to treat from 25,000 to 75,000 gallons of water, varying according to the nature of the water. The amount of water contained in the mixture may be varied to a great extent, but should be one gallon or more for each pound of lime, being preferably in excess of this proportion in order to make a liquid thin enough to be readily handled.

In the art to which this invention relates, it is well-known that in order to properly slake the lime to be used, so as to obtain the best results, each individual atom of lime must get its quota of water at the exact moment in which it is required during the slaking process. It is also well-known that in slaking lime in quantities such as can be operated by manual labor, it is practically impossible to obtain the best results. It is not only impossible to stir the lime with such uniformity to present the water in contact with the particles at the proper instant to produce perfect slaking, but it is also practically impossible to manually supply the water during the process of stirring and slaking in exactly the quantities necessary to produce the best results. Furthermore, it is well-known that when soda-ash is thrown into water to be dissolved, its tendency is to settle to the bottom and it is, therefore, very desirable to provide a mixture of lime and water of substantially the consistency of thick cream and then introduce and mix in the soda-ash in order to prevent the soda-ash from settling to the bottom. In other words, it is desirable to maintain the soda-ash in suspension in the lime mixture or cream of lime until the soda-ash is thoroughly dissolved, thus exposing a great surface area to the dissolving action of the cream of lime, and keeping the soda-ash in small particles until dissolved.

In practicing my improved process, therefore, I place the desired quantity of unslaked lime in the drum,—say, 125 pounds—
and then introduce at first just a sufficient quantity of water to completely cover the unslaked lime. The mixture is then allowed to stand until the slaking of the lime begins or the drum may be at once set in operation and its rotation continued during the slaking of the lime. While the drum is rotating sufficient water is introduced to supply the lime with substantially such a proportion of water as the slaking of the lime requires, in order to supply the atoms or particles of the lime each with the required amount of water at the required moment. This operation is continued until all of the lime contained in the drum is thoroughly slaked and until the solution of slaked lime attains the consistency of thick cream or a slime. The mixture in this condition contains about one pound of slaked lime to each gallon of water, and it will be readily seen that soda-ash introduced into a mixture of this consistency will be held in suspension throughout the mixture in small particles exposing a large surface until such soda-ash is thoroughly dissolved. The drum having been steadily revolved at a uniform rate of speed during the slaking of the lime, it will be readily seen that substantially every portion of the lime is utilized and the solution, slime or cream of lime contains the full strength of the lime. The lime so slaked in different batches may be depended upon as uniform, each batch containing the full strength of the lime, and in treating water the proper proportions may thus be introduced without difficulty.

The lime having been thoroughly slaked and being in the form of a slime or solution of substantially the consistency of thick cream the desired amount of soda-ash is introduced into the lime mixture and the drum is kept revolving during the mixture of the soda-ash with the lime mixture,—a sufficient quantity of water being also introduced preferably simultaneously with the soda-ash or immediately before or after the introduction of the soda-ash, to keep the mixture of substantially the consistency of a slime or cream until the soda-ash contained therein is thoroughly dissolved. A sufficient quantity of water may then be added to thin the solution so that it is in the form of a thin liquid that may be readily handled by means of pumping mechanism or in any desired manner. The solution is then drawn off through the outlet opening $n$ and placed in a chemical tank, such as the tank $b$ being thoroughly filtered by passing it through a screen $y$ the meshes of which are sufficiently fine to separate the unslaked portions of the lime and coarse sediment from the solution. This solution, containing slaked lime and dissolved soda-ash intermixed with a sufficient quantity of water to form a liquid, is then kept in a continuous state of agitation for the purpose of maintaining the precipitates in suspension during the introduction of such chemical solution into the water to be treated. The water to be treated is then set to flowing into a suitable tank, such as the tank $c$ shown in the drawings, for containing it during treatment and after treatment if desired, and as the water is flowing into such tank the chemical reagent is introduced therein and caused to thoroughly mingle therewith in the desired proportion. The chemical reagent in the condition in which it is introduced into the water to be treated may contain slaked lime in about the proportion of one pound to each one and one-half gallon of water and any desired amount of soda-ash mingled in such mixture. The amount of soda-ash employed may vary with conditions which are already well-known to those skilled in the art.

The water to be treated, together with the desired proportion of chemical solution, having been introduced into the treating tank or treating and storage tank, the same is then maintained in an undisturbed condition until the precipitates settle to the bottom of the tank, and such precipitates and the sediment which accumulates are then drawn off from the bottom of the tank by means of the outlet pipe 60 shown in the drawings. The treated water is then in condition to be drawn off for use, or it may be allowed to remain stored in the same tank in which it has been treated as long as desired. It is very desirable, however, that the mixing of the chemical mixture, and the introducing of the water and chemicals into the treating tank may be continued without interruption while the precipitates contained in the water in the treating and storage tank are settling, and if desired while the water from which the precipitates have settled is being drawn off for use. I therefore thoroughly mix the water to be treated with the desired proportion of chemical reagent before permitting it to mingle with the water contained in the tank, and I also permit the entrained air contained in the water which is being introduced with the chemicals to escape without coming in contact with the precipitates contained in the tank or in any way disturbing the water contained in the tank proper so as to prevent the precipitates from settling. This is accomplished by mixing the water to be treated with the chemical mixture while such water is flowing into a stand-pipe, such as the pipe 52 in the treating and storage tank, the air being permitted to pass upward through the pipe without coming in contact with the precipitates in the water already treated. The water thus intermixed with the chemical mixture is, furthermore, caused to pass into the body of water already similarly treated at a point a sufficient distance from the bottom of the tank to prevent disturbing the precipitates and sediment already settled. Its point of mingling with the treated water is also a sufficient distance from the surface of the water to avoid disturbing such treated water. The treated water is drawn off from a point near its surface by means of a floating pipe, such as the pipe 64, and the drawing off of the water may thus be accomplished while the introduction of water containing chemicals is continued, and while the settling of the precipitates is in progress. The drawing off of sediment from the tank may be done at any time.

I claim:

1. The process of purifying water, which consists in mixing water with lime till the lime is thoroughly slaked and the mixture has a creamy consistency, then adding soda ash to the mixture, then storing it in a stirring tank to prevent settling, and finally mingling the mixture with the water to be treated as both are introduced into a settling chamber.

2. The process of purifying water, which consists in mechanically agitating lime, adding water meanwhile till it is thoroughly slaked and the mixture has a creamy consistency, then adding soda ash to the mixture while the agitation is continued, then storing it in a stirring tank to prevent settling, and finally mingling it with the water to be purified.

3. The process of purifying water, which consists in placing lime within a rotating drum, adding water thereto till the lime is thoroughly slaked and the mixture has a creamy consistency, then introducing soda ash in the mixture, and finally adding the mixture to the water to be treated.

WILLIAM A. POWERS.

Witnesses:
ERWIN H. BERRY,
R. N. TREZISE.